United States Patent [19]

Yamamoto et al.

[11] Patent Number: 4,662,672
[45] Date of Patent: May 5, 1987

[54] LACKING DEVICE FOR A DETACHABLE PANEL OF VEHICLES

[75] Inventors: Junji Yamamoto, Nagoya; Noboru Kanou; Masayuki Usami, both of Toyota, all of Japan

[73] Assignees: Aisin Seiki Kabushiki Kaisha, Kariya; Toyota Jidosha Kogyo Kabushiki Kaisha, Toyota, both of Japan

[21] Appl. No.: 227,934

[22] Filed: Jan. 23, 1981

[30] Foreign Application Priority Data

Jan. 24, 1980 [JP] Japan ............................ 55-7791[U]

[51] Int. Cl.$^4$ .............................................. B60J 7/19
[52] U.S. Cl. ................................ 296/224; 296/218; 292/74
[58] Field of Search ............... 296/215, 216, 218, 221, 296/224; 24/527; 292/74, 75, DIG. 15

[56] References Cited

U.S. PATENT DOCUMENTS 4,005,901 2/1977 Lutke et al. .................. 296/224
4,126,352 11/1978 Vogel .............................. 296/224

FOREIGN PATENT DOCUMENTS 1318120 1/1963 France ............................ 292/74
1492333 11/1977 United Kingdom .

Primary Examiner—Robert B. Reeves
Assistant Examiner—Dennis H. Pedder
Attorney, Agent, or Firm—Finnegan, Henderson, Farabow, Garrett & Dunner

[57] ABSTRACT

A locking device for a detachable panel fitted in a roof opening of automobiles comprises a pivotable lever mounted to the panel, a stationary body fixed to the vehicle roof, and a link mechanism securely fixed to the lever while pivoted to the stationary body. The link mechanism includes a pair of links each provided with a recess while the stationary body includes a pair of arms each provided with a pin resiliently urged to fit in the recess to lock the position of the panel at the partially open state. The recess includes two lateral edges one of which extends higher than the other other to act as the stopper of the pin, to thereby limit excessive rotational movement of the panel with respect to the stationary body.

1 Claim, 4 Drawing Figures

LACKING DEVICE FOR A DETACHABLE PANEL OF VEHICLES

BACKGROUND OF THE INVENTION

1. Field of the Invention

The present invention relates generally to a detachable panel fitted in a roof opening of vehicles such as automobiles and more particularly to a locking device for keeping the position of the detachable panel in the partially open or the closed state.

2. Description of the Prior Art

In automobiles provided with a roof opening which is to be closed by a detachable panel, it is necessary to lock the position of the panel at the partially open or the closed state. The conventional locking means comprises a lever pivoted to the panel, a stationary body fixed to the vehicle roof, and a link mechanism securely fitted to the lever while pivotally mounted on the stationary body. The link mechanism includes a pair of links each provided with a recess, while the stationary body includes a pair of parallel arms each provided with a resiliently urged projection or pin to fit within the recess.

Thus, the engagement of the pins on the stationary body with the recesses on the pivotable link mechanism locks the detachable panel at the partially open position.

According to the conventional locking means, however, excessive rotational movement of the panel or the link mechanism with respect to the stationary body will result in disengagement of the pins from the recesses. That is, when the panel is rapidly rotated or swung about the hinge at the front portion of the vehicle in the partially open position from the closed position thereof, the recesses on the link mechanism will pass over the pins on the stationary body with the result that the panel may not be kept at the partially open position thereof.

SUMMARY OF THE INVENTION

It is, therefore, a primary object of the invention to provide a locking device for a detachable panel which will ensure locking of the panel at the partially open position even upon fast rotation of the panel.

According to the invention, each recess is provided at each lateral side thereof with an edge. One of the edges includes a straight wall higher than the other edge, to thereby limit the further movement of the link mechanism relative to the stationary body.

The other objects and features of the invention will be apparent from the following description of a preferred embodiment with reference to the accompanying drawings.

DETAILED DESCRIPTION OF THE PREFERRED EMBODIMENT

Reference will now be made in detail to the present preferred embodiment of the invention, an example of which is illustrated in the accompanying drawings.

Figure 1:
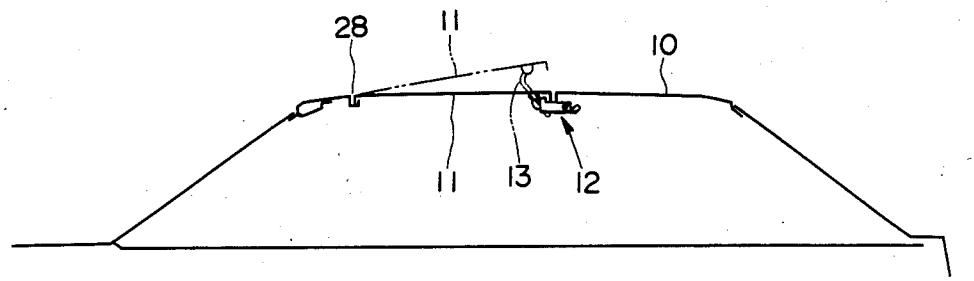
FIG. 1 is a schematic view of a vehicle roof incorporating a locking device in accordance with the present invention.

With particular reference to FIG. 1, a vehicle roof 10 includes a detachable panel 11 located generally in the front portion of the vehicle. The panel 11 may be opened by rotation up to the position shown by the chain line configuration and may be locked by means of a locking device 12 which is more specifically described hereinbelow with reference to FIG. 2 and 3.

The locking device 12 includes a lever 13 pivotally connected to a pair of brackets 14 for attachment to the rear edge of panel 11. Each bracket 14 is provided with a hole 15 through which any suitable pin or bolt, not shown, passes. The locking device 12 further includes a stationary body 16 securely fixed to the vehicle roof 10 by bolts, not shown, which pass through holes 17, 17 provided therein. The stationary body 16 and the brackets 14 are operatively connected to each other by means of the lever 13 and a pair of crank-shaped links 18, 18.

Figure 3:
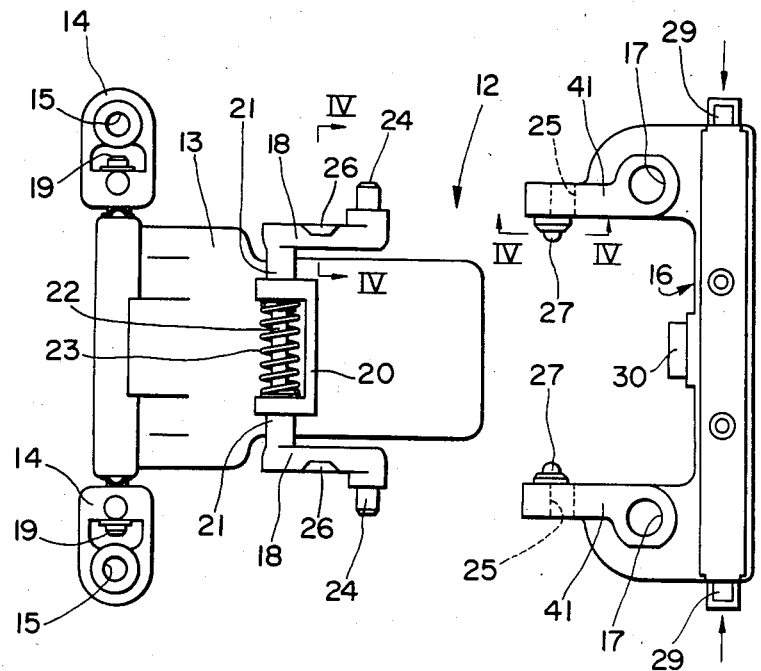
FIG. 3 is a plan view of the locking device of FIG. 1 in the free position thereof before constituent elements thereof are completely assembled with each other.

More particularly, the lever 13 is pivoted at the left end thereof to the brackets 14 by shafts 19, 19 (see e.g., FIG. 3). The links 18, 18 are pivotally connected to an intermediate bracket 20 which is securely fitted to the lever 13. each link 18 includes a hollow hub 21 in which a common shaft 22 is slidably mounted and is urged to move in opposite direction by a helical spring 23 interposed therebetween. In the position as illustrated in FIG. 3, the spring 23 engages at opposite ends thereof with the inner walls of the intermediate bracket 20 thereby being prevented from further stretching.

Figure 2:
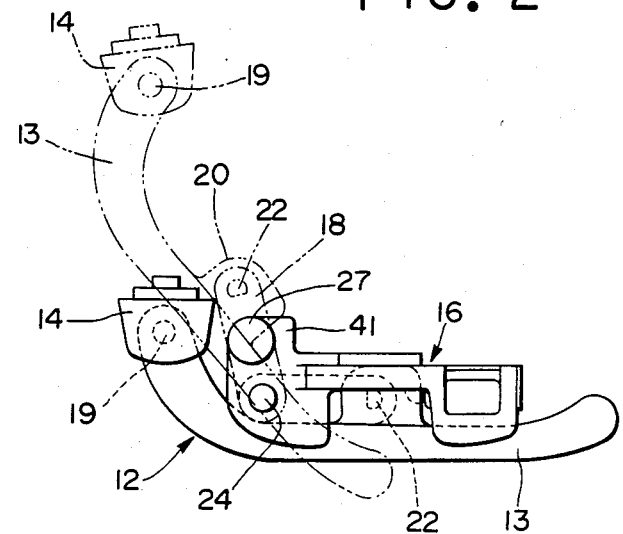
FIG. 2 is a side view of the locking device of FIG. 1 showing the different positions thereof by the solid and the chain line configurations.
Figure 4:
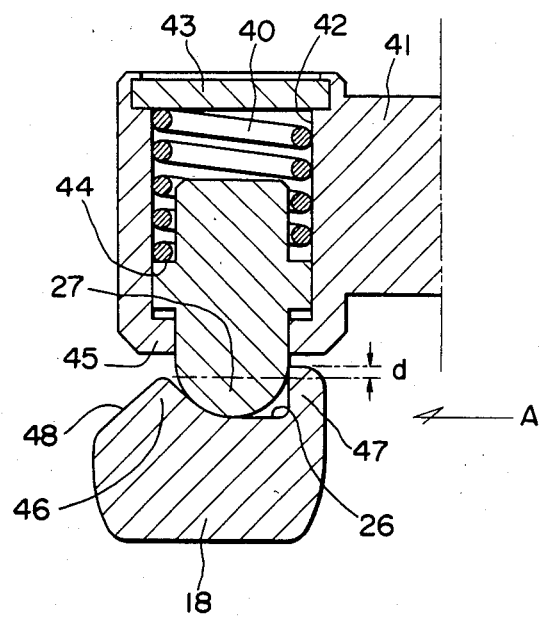
FIG. 4 is a sectional view taken along line IV—IV in FIG. 3 and shown in an enlarged scale.

Each link 18 is provided with a pin 24 which is to be rotatably supported in a hole 25 of the body 16 when the locking device 12 is completely assembled as shown in FIG. 2, and with a recess 26 which is to be engaged with an inward projecting pin or stopper 27 resiliently mounted in the stationary body 16. The pin is urged to project by a spring 40 (FIG. 4) as seen in FIGS. 3 and 4 but may be retracted against the spring force. Once the pines 27, 27 engage the recesses 26, the panel 11 will be kept at the position as illustrated by the chain line configuration of FIG. 2. That is, the downward movement of the right tip of the lever 13, as viewed in FIG. 2, causes the attachment brackets 14 to move up to the position denoted by the chain line configuration due to the linking mechanism comprising the lever 13, the links 18, 18, and panel 11 and the vehicle roof 10. Thus, the panel 11 is rotated at the front edge thereof around a hinge 28 provided at the front portion of the vehicle roof 10 to thereby occupy the partially open position as shown by the chain line in FIG. 1. Such partially open position of the panel 11 is locked by the engagement of the pins 27, 27 with the recesses 26, 26, as will be explained hereafter.

The clockwise rotation of the panel 11 around the hinge 28 causes the pins 27, 27 to release from the recess 26, 26 thereby permitting the panel 11 to occupy the closed position as shown by the solid line configuration in FIG. 1. The stationary body 16 is provided at each lateral edge thereof with a knob 29 which is axially movable against a spring (not shown) interposed between two knobs 29, 29. The spring also urges an intermediate knob 30 which is mounted at the intermediate portion of the body 16 movably against the spring. when one or both of the knobs 29, 29 are pressed in the direction indicated by the arrows in FIG. 3, the intermediate knob 30 is retracted within the body 16 to thereby permit the right tip of the lever 13 to pass. The release of the knobs 29, 29 caues the intermediate knob 30 to project due to the spring force thereby keeping the panel 11 at the closed position.

When the roof panel 11 is to be fully opened, the links 18, 18 are moved inward to approach each other against the helical spring 23, to thereby disengage the pins 24, 24 from the holes 25, 25. Thus, the links 18, 18 may be removed from the stationary body 16. The panel 11 is detachable from the hing 28 in the well-known manner.

FIG. 4 illustrates the details of the locking means in accordance with the invention.

The stationary body 16 includes a pair of parallel arms 41 each being provided above the hole 25 with a hole 42 within which the compression spring 40 and the pin 27 are disposed. The spring 40 is interposed between a fixed cap 43 and a flange shoulder 44 of the pin 27 to thereby urge the pin 27 downward as viewed in FIG. 4. The hole 42 is formed with a shoulder 45 to engage the flange shoulder 44 of the pin 27 which is thus prevented from the axial withdrawal.

The link 18 is formed with the recess 26 to provide a left edge 46 and a right edge 47. The left edge 46 is provided at the outer surface thereof with a inclined guide surface 48. The right edge 47 is provided at the inner surface thereof with a straight wall 49 which is higher than the left edge 46 by a distance d.

When the links 18, 18 are rotated from the position shown by the solid line to the position shown by the chain line in FIG. 2, the link 18 which has been located at the right side relative to the pin 27 is moved in the left direction as indicated by the arrow A in FIG. 4. The rounded tip of the pin 27 is at first engaged with the inclined guide surface 48 of the link 18 and slid therealong to pass over the left edge 46, then engaged with the recess 26. The abutment of the pin 27 on the straight wall 49 of the right edge 47 will limit the further movement of the link 18 relative to the stationary arm 41. Therefore, the panel 11 is locked at the partially open position by means of the resilient connection between the stopper pins 27, 27 and the recesses 26, 26.

Obviously, many modifications and changes are possible in light of the above teaching. Therefore, the scope and spirit of the invention should be construed based on the following claims.

What is claimed is:

1. A locking device for a panel fitted in an opening in a vehicle roof, the panel being hinged at a front edge thereof and lockable in an open position, the locking device comprising:
    (a) a lever pivotally mounted on said panel near a rear edge thereof having a free end and being pivotable into a position extending under said roof;
    (b) a link mechanism including:
       a intermediate bracket securely fixed to said lever,
       a pair of links pivotally mounted on said bracket and having parallel portions extending substantially along said lever toward said free end, and
       recess means in the surfaces of said parallel portions on the sides thereof opposite said lever;
    (c) a stationary body securely fixed to the under side of said vehicle roof, said body having a pair of parallel arms for extending substantially along the sides of said lever said links being pivotally mounted to said arms, and said body having locking pins mounted in opposing surfaces of said arms, said pins being resiliently biased outwardly from said arms and toward each other for insertion into said recess means, wherein each of said recess means includes a first inclined surface for guiding its respective locking pin toward the recess while depressing the pin against its bias and a second inclined surface smoothly intersecting said first inclined surface at their respective zeniths for guiding said pin downward under its bias into said recess, said locking pin having a periphery which engages in said recess, said periphery being arcuate for cooperating with said first inclined surface, and said arcuate periphery being complementary to a portion of said second inclined surface for cooperating therewith, and wherein said recess means further includes a planar wall for receiving said pin as guided thereagainst by said second inclined surface, the height of said planar wall being greater than the height of said intersection of said two inclined surfaces; and
    (d) a locking force for forcing said pin against said planar wall when said panel is locked in an open position, said locking force resulting from contact between said pin and said second inclined surface in the presence of said biasing force, said locking force having two vector force components, one opposite the direction of the bias and one perpendicular to the direction of the bias, said perpendicular force component locking said pin against said planar wall.

* * * * *